US007173515B2

(12) United States Patent
Ohki et al.

(10) Patent No.: US 7,173,515 B2
(45) Date of Patent: Feb. 6, 2007

(54) RFID TAG, AND RFID TAG-RELATED DETERMINING DEVICE AND METHOD, AND MANAGEMENT SYSTEM AND METHOD

(75) Inventors: Masaru Ohki, Tokorozawa (JP); Hideki Tokuyama, Sagamihara (JP); Rei Itsuki, Hiroshima (JP); Shojiro Asai, Tokyo (JP); Kazuo Takaragi, Ebina (JP); Atsushi Tanaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 198 days.

(21) Appl. No.: 10/378,645

(22) Filed: Mar. 5, 2003

(65) Prior Publication Data

US 2003/0169149 A1 Sep. 11, 2003

(30) Foreign Application Priority Data

Mar. 7, 2002 (JP) ............................ 2002-062630

(51) Int. Cl.
*G06F 7/04* (2006.01)
*H04Q 5/22* (2006.01)

(52) U.S. Cl. .................... 340/5.61; 340/5.8; 340/10.42

(58) Field of Classification Search ............... 340/5.61, 340/10.4, 10.41, 10.42; 705/22, 28; 235/357, 235/385; 349/5.61, 10.41, 10.42
See application file for complete search history.

(56) References Cited

U.S. PATENT DOCUMENTS 4,656,463 A * 4/1987 Anders et al. ........... 340/10.42
6,226,619 B1 5/2001 Halperin
6,266,492 B1 * 7/2001 Maehara ...................... 399/12
6,385,407 B1 * 5/2002 Inose ...................... 340/539.1
6,467,888 B2 * 10/2002 Wheeler et al. .............. 347/85
6,480,100 B1 * 11/2002 Frieden et al. ............. 340/10.1
6,577,241 B2 * 6/2003 Neidig et al. ............ 340/573.3
6,763,996 B2 * 7/2004 Rakers et al. ............... 235/375

(Continued)

FOREIGN PATENT DOCUMENTS

CN 1164073 A 11/1997

(Continued)

OTHER PUBLICATIONS

Bob Cooper, "ISO Electronic ID Standards Update", 1995.*

(Continued)

*Primary Examiner*—Wendy Garber
*Assistant Examiner*—Clara Yang
(74) *Attorney, Agent, or Firm*—Mattingly, Stanger, Malur & Brundidge, P.C.

(57) ABSTRACT

A RFID tag structure determining the authenticity of an article, and an information processing system for reading RFID tags, enable authenticity determinations of articles using read only RFID tags. A plurality of RFID tags, each holding tag information inside ROM (read-only memory) and responding to tag information via a radio wave received from a reader, are designed to have a service identifier which designates a common utilization goal for which the same value is set, and service data which sets different values for the respective RFID tags, as tag information. By dividing the data structure of a RFID tag having a read-only memory into a service identifier, which is common to a certain product, and sequential data for managing individual products, it is possible to confirm that an article is authentic by simply confirming the service identifier.

19 Claims, 15 Drawing Sheets

U.S. PATENT DOCUMENTS

2003/0006281 A1* 1/2003 Thomas et al. ............... 705/22
2003/0137403 A1* 7/2003 Carrender et al. ......... 340/10.4
2003/0209614 A1* 11/2003 Chung ........................ 235/385

FOREIGN PATENT DOCUMENTS

JP 05158568 6/1997
JP 2002 24767 1/2002
WO 9607938 3/1996

OTHER PUBLICATIONS

K. Ashton, "Introduction to the Auto-ID Center", www.autoidcenter.org, MIT 2002, pp. 1-10.

* cited by examiner

RFID TAG, AND RFID TAG-RELATED DETERMINING DEVICE AND METHOD, AND MANAGEMENT SYSTEM AND METHOD

BACKGROUND OF THE INVENTION

The present invention relates to the data structure of a RFID(Radio Frequency Identification) tag, which uses a contactless IC chip, to an information processing system for reading a RFID tag, and to a product authenticity determining system for determining the authenticity of a product utilizing a RFID tag.

A conventional RFID tag generally has a read-write memory. A read-write memory is convenient in that it allows the contents of the memory to be freely rewritten, but this ability to rewrite memory contents also makes it possible to produce counterfeit RFID tags. Various technologies have been put into practice for preventing counterfeiting. For example, for paper money, microprinting, watermarks and other special manufacturing techniques and used to indicate that a bill is genuine, and, in the case of credit cards, holograms are being used to prevent counterfeiting.

When using RFID tags that also prevent counterfeiting and the like, RFID tags having a read-write memory (hereinafter referred to as RAM (random access memory) RFID tags) have been used. However, the problem with read and write RFID tags is that, due to the need for special circuitry for rewriting the memory and security circuitry for preventing the memory from being freely overwritten, the chips become large in size and are high in price.

Further, since it has not been possible to unfailingly prevent the production of counterfeit tags in the past, there were no effective systems for determining authenticity, making it impossible to determine authenticity with accuracy.

SUMMARY OF THE INVENTION

An object of the present invention is to provide a RFID tag structure that is suited to determining the authenticity of articles or parts.

Another object of the present invention is to provide an information processing system for reading RFID tags, which makes it possible to accurately determine the authenticity of articles or parts using ROM (read-only memory) RFID tags.

Yet another object of the present invention is to provide a product authenticity determining system for determining the authenticity of products using RFID tags, which makes it possible to accurately determine the authenticity of articles or parts using read only RFID tags.

One characteristic of the present invention is that information stored in read only RFID tags is constituted from service identifiers, which are values common to certain categories, and service data, which constitute user-specific data, and serial numbers.

Further, another characteristic of the present invention is that additions and changes are made possible by storing, in the data of a RFID tag, information for adding a service identifier to be stored in the RFID tag for confirming the authenticity of a product, as well as the service identifier for confirming authenticity of a product.

In addition, another characteristic of the present invention is that a product is determined to be authentic by a method wherein a service identifier, which is stored in a RFID tag by allocating a predetermined bit of the data recorded in a RFID tag, and which provides service data for specifying the respective specified products manufactured by this product manufacturer, is read out using a handy RFID tag data reader; and, when this service identifier matches a service identifier stored beforehand, the fact that a match is established is displayed by the tag data reader.

According to the present invention, it is possible to provide a RFID tag structure that is suited to determining the authenticity of articles or parts.

Further, according to the present invention, it is possible to provide an information processing system for reading RFID tags and for enabling the authenticity of articles or parts to be accurately determined using read only RFID tags.

Furthermore, according to the present invention, it is possible to use the service identifiers of read only RFID tags to confirm the genuineness of articles or parts without having to access a server or the like, thereby enabling the prevention of counterfeiting.

Still further, according to the present invention, by using read only RFID tags, it is possible to carry out the updating of service identifiers stored in an information processing system that uses RFID tags, thereby enabling service identifier updating to be carried out easily.

DESCRIPTION OF THE PREFERRED EMBODIMENTS

Figure 1:
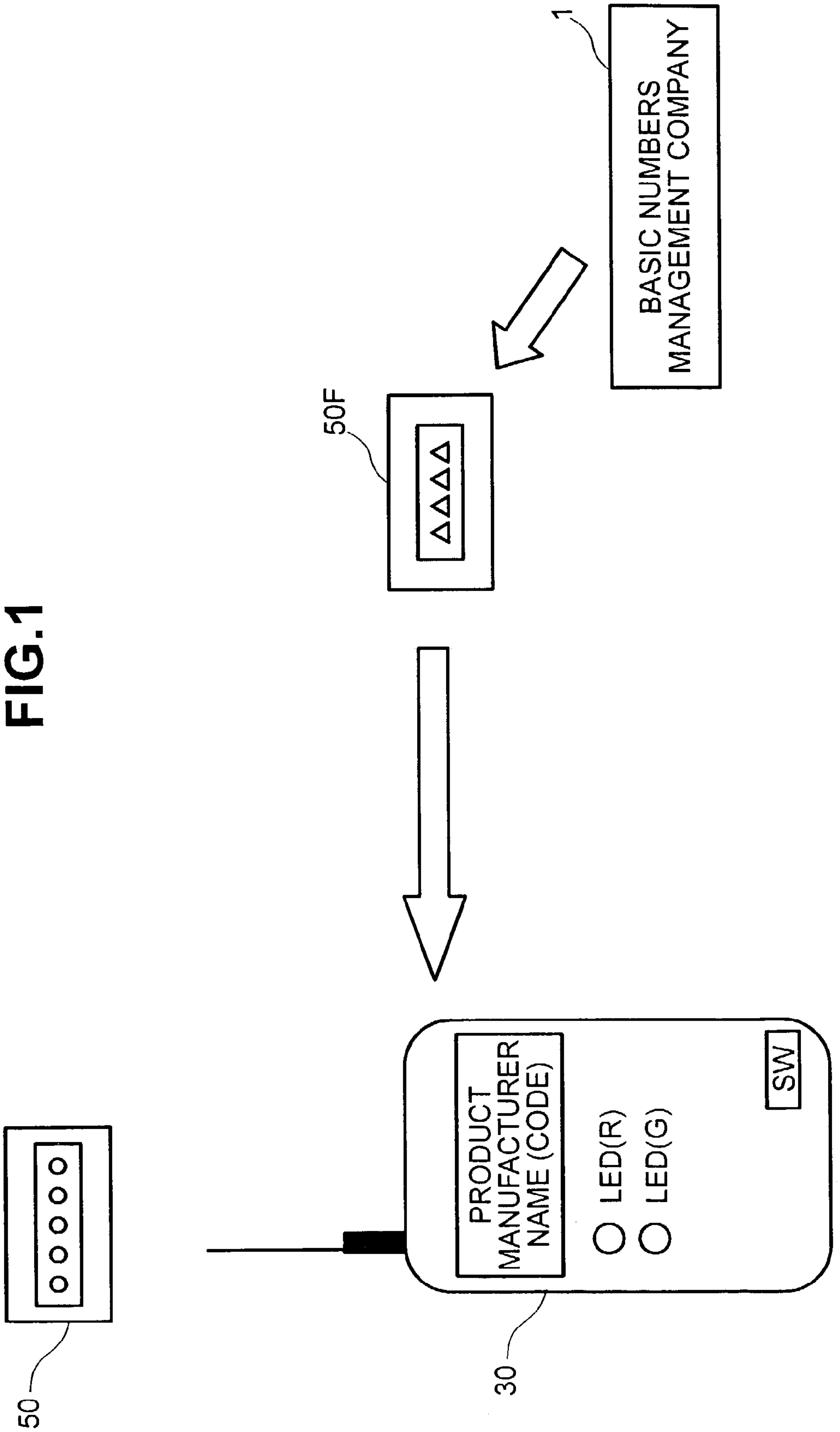
FIG. 1 is a diagram showing the transmission-reception relationship of principal information for implementing a product authenticity determining system for determining the authenticity of products using RFID tags.
Figure 2:
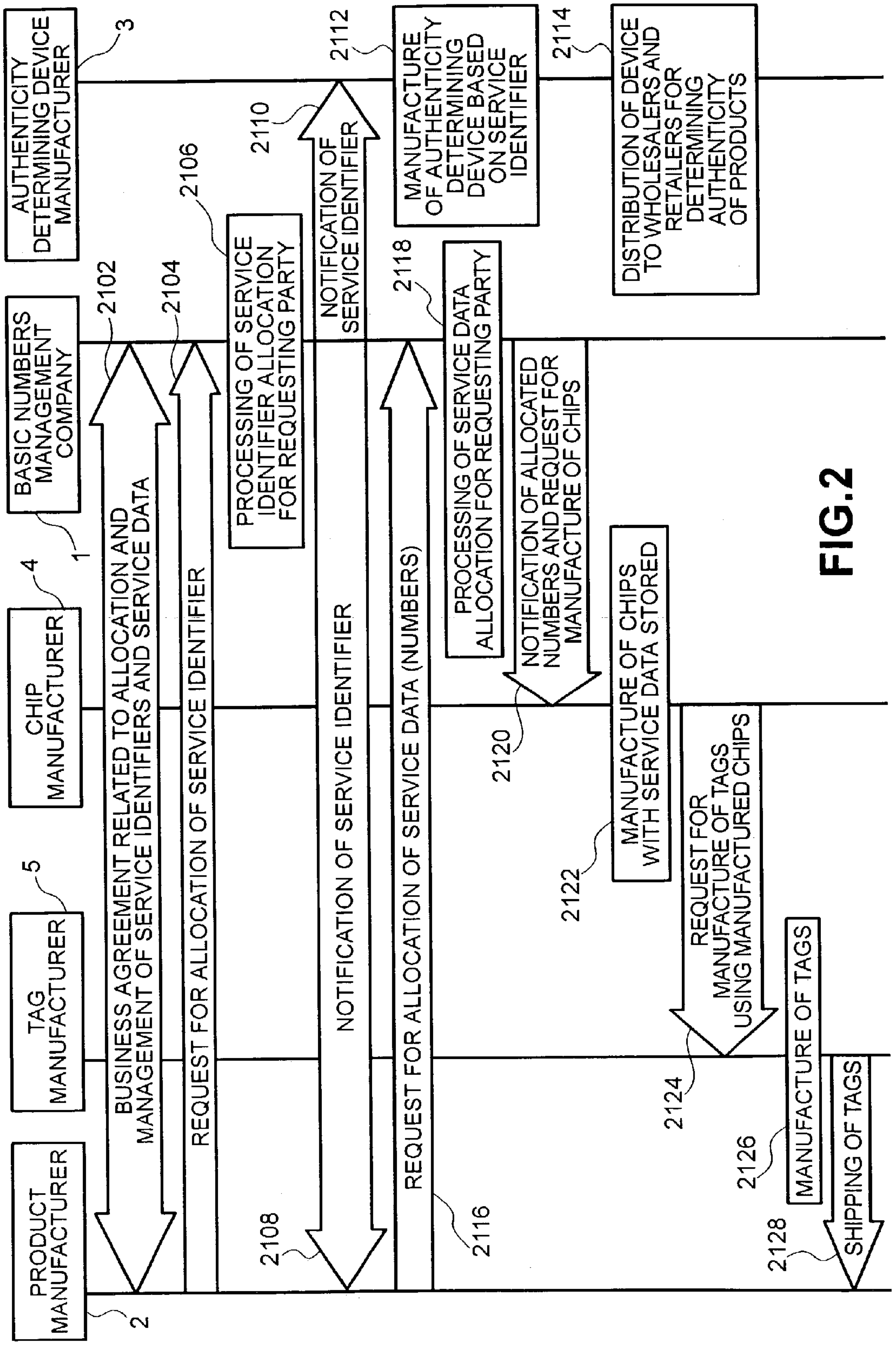
FIG. 2 is a diagram showing an embodiment of a product authenticity determining system for determining the authenticity of products using RFID tags.
Figure 3:
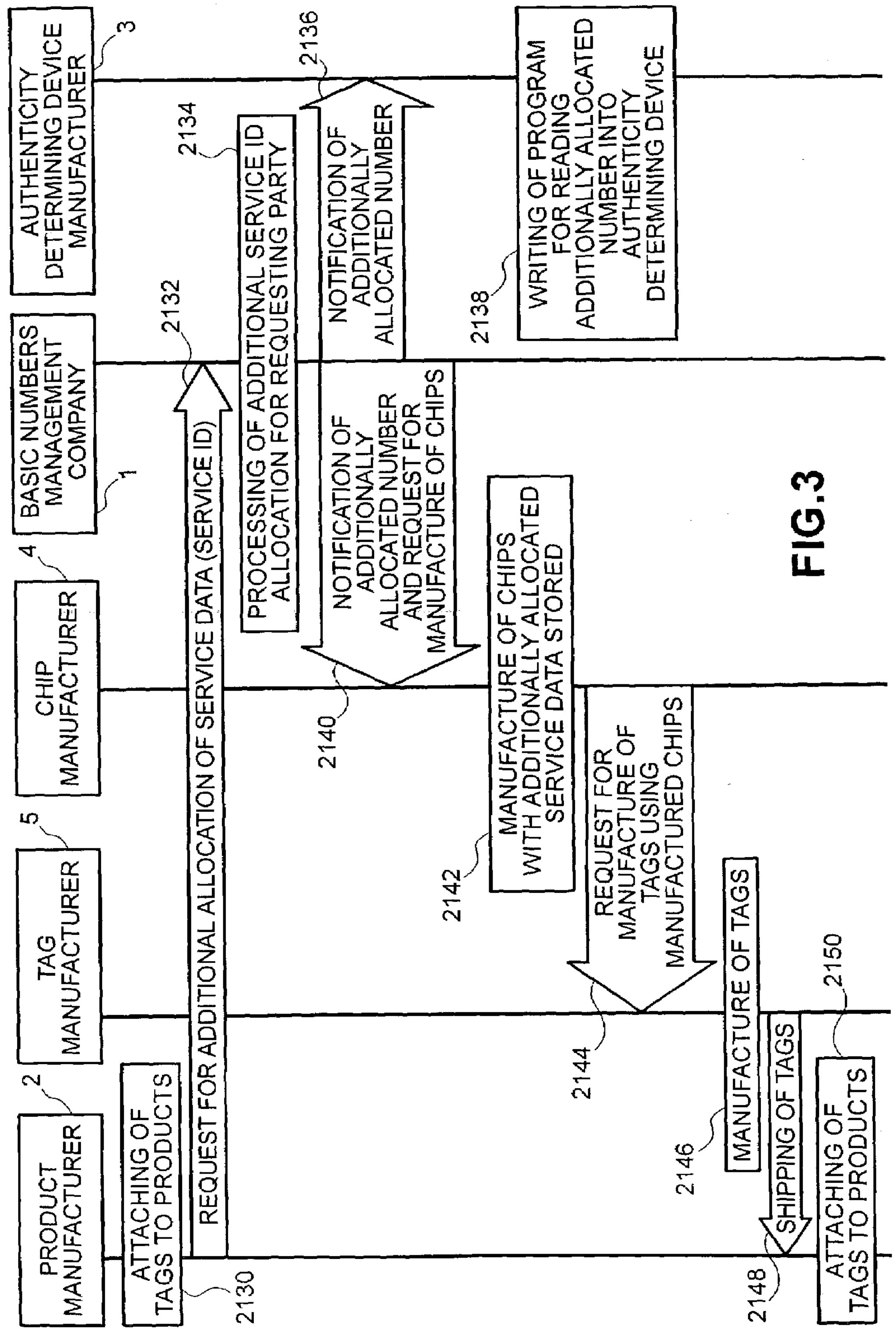
FIG. 3 is a diagram showing an embodiment of a product authenticity determining system for determining the authenticity of products using RFID tags.

FIG. 1 shows the transmission-reception relationship of principal information for implementing a product authenticity determining system for determining the authenticity of products using RFID tags and, FIG. 2 and FIG. 3 show aspects of an embodiment of a product authenticity determining system for determining the authenticity of products using RFID tags.

In FIG. 1, a basic numbers management company 1 carries out numbers management of data stored in a RFID tag 50. For this purpose, as seen in FIG. 2, basic numbers management company 1 enters into a business agreement with a product manufacturer 2, which uses RFID tags 50 for its products. The basic numbers management company 1 provides for the allocation and management of the numbers which represent the data stored in the RFID tags 50. Then, allocated and managed numbers are stored in RFID tags 50, and the RFID tags 50 in which these numbers are stored can be used to determine the authenticity of the products to which these RFID tags 50 are appended by checking the numbers stored in the RFID tags using an authenticity determining device 30, in which the allocated and managed numbers are stored beforehand.

Figure 4:
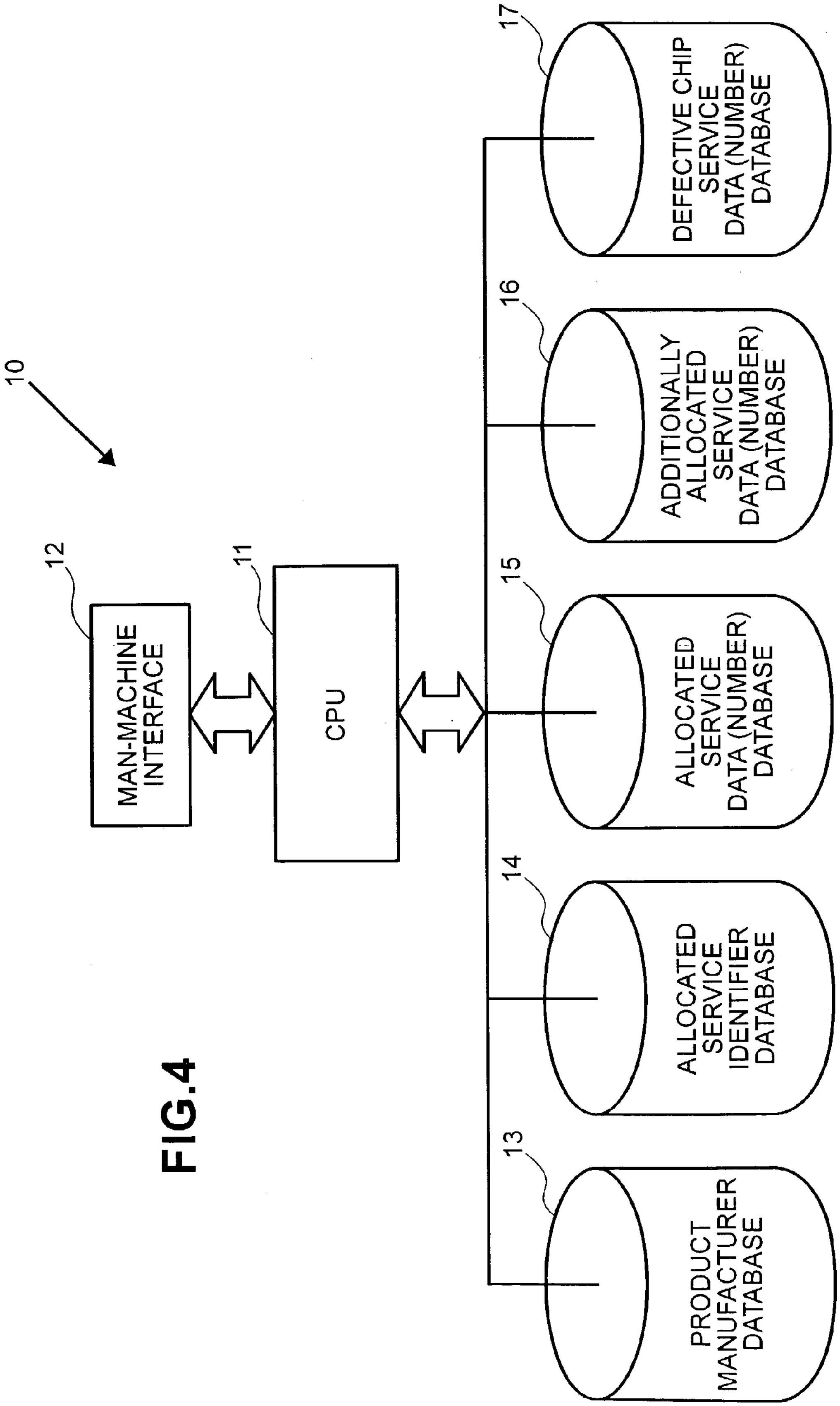
FIG. 4 is a diagram showing the constitution of a processing system of a basic numbers management company.

This basic numbers management company 1 has a processing system having a constitution as shown in FIG. 4. Specifically, processing system 10 has a CPU 11, and processing is carried out by this CPU 11. A man-machine interface 12 is connected to this CPU 11 via a bus line; and, storage devices, which constitute various types of databases, are connected to this CPU 11 via bus lines. The man-machine interface 12 carries out the input-output processing (the writing and reading of data, and so forth) of processing system 10. Further, the storage devices comprise a product manufacturer database 13, an allocated service identifier database 14, an allocated service data (numbers) database 15, an additionally allocated service data (numbers) database 16, and a defective chip service data (numbers) database 17.

As shown in FIG. 2, after the basic numbers management company 1 concludes a business agreement with product manufacturer 2, which utilizes RFID tags 50 for its products, the product manufacturer 2 is registered in the product manufacturer database 13 of FIG. 4 (2102). After concluding this business arrangement, product manufacturer 2 makes a request to basic numbers management company 1 for the allocation of service identifiers (2104). Basic numbers management company 1, having received the request for the allocation of service identifiers from this product manufacturer 2, carries out processing for the allocation of service identifiers for product manufacturer 2, which is the requester, and registers the allocated service identifiers in allocated service identifier database 14 of FIG. 4 (2106).

Basic numbers management company 1, which carries out this service identifier allocation processing, communicates the allocated service identifiers (for example, 3-bit numerals) to this product manufacturer 2, which is the requester (2108). In addition to sending this information to product manufacturer 2, the allocated service identifiers (for example, 3-bit numerals) are also sent to an authenticity determining device manufacturer 3, which manufactures an authenticity determining device 30 for reading the data stored in these RFID tags 50 (2110). Or, there are also cases in which notification is sent to the authenticity determining device manufacturer 3 from the product manufacturer 2.

The authenticity determining device manufacturer 3, which receives this notification of allocated service identifiers (for example, 3-bit numerals), manufactures authenticity determining devices 30, based on the allocated service identifiers about which notification was received from this basic numbers management company 1 (2112). These manufactured authenticity determining devices 30 are distributed to wholesalers, retailers, and others who will determine the authenticity of- products (2114). Further, a chip manufacturer receives a notification of the allocated service identifiers in the same way as the authenticity determining device manufacturer 3, for use in the manufacture of chips.

In the meantime, the product manufacturer 2, which receives the notification of allocated service identifiers (for example, 3-bit numerals), makes a request to basic numbers management company 1 for the allocation of the required number of service data (numbers) based on this allocated service identifier (for example, 100,000 items for S size user data of a specific product) (2116). Basic numbers management company 1, which receives this request for the allocation of the required number of service data (numbers) from product manufacturer 2, carries out the allocation processing of service data (numbers) for product manufacturer 2, which is the requester, and registers the allocated service data in the allocated service data database 15 of FIG. 4 (2118). Basic numbers management company 1, which carried out the allocation processing of this service data (numbers), notifies the product manufacturer and the chip manufacturer 4 of the allocated service identifiers and service data (numbers) based on this allocated service data (numbers), and requests the manufacture of chips in which this allocated service data (numbers) is stored (2120).

When this request for the manufacture of chips is received from the basic numbers management company 1, chip manufacturer 4 manufactures chips in which these allocated service identifiers and service data (numbers) are stored (2122). When the chips in which this allocated service data (numbers) is stored are manufactured, the chip manufacturer 4 sends the manufactured chips to a tag manufacturer 5, and requests the manufacture of tags in which these chips are embedded (2124). Upon receiving this request for the manufacture of tags, tag manufacturer 5 manufactures tags using the chips sent from chip manufacturer 4 (2126). When the tags have been manufactured, this tag manufacturer 5 sends these manufactured tags to product manufacturer 2 (2128). These manufactured tags are attached to products by the product manufacturer 2 (2130).

Not all of the service identifiers (for example, 3-bit numerals) allocated by this basic numbers management company 1 are necessarily used. There are times when a certain amount of defects are generated at the chip manufacturing stage by the chip manufacturer 4 and at the stage when tags are manufactured using the manufactured chips. In these cases, the allocated service identifiers (for example, 3-bit numerals) stored in these defective tags and chips constitute missing numbers. These allocated service identifiers (for example, 3-bit numerals), which constitute missing numbers, are stored in defective chip service data (numbers) database 17 shown in FIG. 4.

Furthermore, the authenticity determining device manufacturer also receives a notification of the allocated service data, in the same way as the chip manufacturer, and uses this information in the manufacture of the authenticity determining devices 30.

Further, as seen in FIG. 3, product manufacturer 2 makes a request to basic numbers management company 1 for the additional allocation of service data (service IDs) (2132). Basic numbers management company 1, which receives this request for the additional allocation of new service data (service IDs) from product manufacturer 2, carries out allocation processing of additional service IDs for product manufacturer 2, which is the requester, and registers the allocated new service data in the additionally allocated service data database 16 of FIG. 4 (2134). Basic numbers management company 1, which carries out this processing for the allocation of additional service IDs, communicates these allocated additional service IDs (for example, 3-bit numerals) to the product manufacturer, as well as to the authenticity determining device manufacturer 3, which manufactures authenticity determining devices 30 for reading the data stored in RFID tags 50 (2136).

Authenticity determining device manufacturer 3, which receives the notification of these allocated additional service IDs (for example, 3-bit numerals), writes a program for reading additional service IDs into authenticity determining devices 30, based on the allocated additional service IDs, about which a notification was received from this basic numbers management company 1 (2138).

Further, together with this notification to authenticity determining device manufacturer 3, basic numbers management company 1, which carried out the allocation processing of these additional service IDs, communicates the allocated service IDs (numbers) to chip manufacturer 4, and requests the manufacture of chips in which these allocated service IDs (numbers) are stored (2140).

Upon receiving this chip manufacturing request from basic numbers management company 1, chip manufacturer 4 manufactures chips in which these allocated service IDs (numbers) are stored (2142). When the chips, in which these allocated service IDs (numbers) are stored, are manufactured by this chip manufacturer 4, these manufactured chips are sent to tag manufacturer 5, and a request is made for the manufacture of tags in which these chips are embedded (2144). Upon receiving this tag manufacturing request, tag manufacturer 5 manufactures tags using the chips sent from the chip manufacturer 4 (2146). When tag manufacturing has been carried out by this tag manufacturer 5, these manufactured tags are sent to product manufacturer 2 (2148). These manufactured tags are attached to products by product manufacturer 2 (2150).

Not all of the service IDs (for example, 3-bit numerals) allocated by this basic numbers management company 1 are necessarily used. There are times when a certain amount of defects are generated at the chip manufacturing stage by the chip manufacturer 4 and at the stage when tags are manufactured using the manufactured chips. In these cases, the allocated service IDs (for example, 3-bit numerals) stored in these defective tags and chips constitute missing numbers. These allocated service IDs (for example, 3-bit numerals), which constitute missing numbers, are stored in defective chip service data (numbers) database 17 shown in FIG. 4.

Service identifiers can also be added using the same procedure as that for service IDs.

Figure 5:
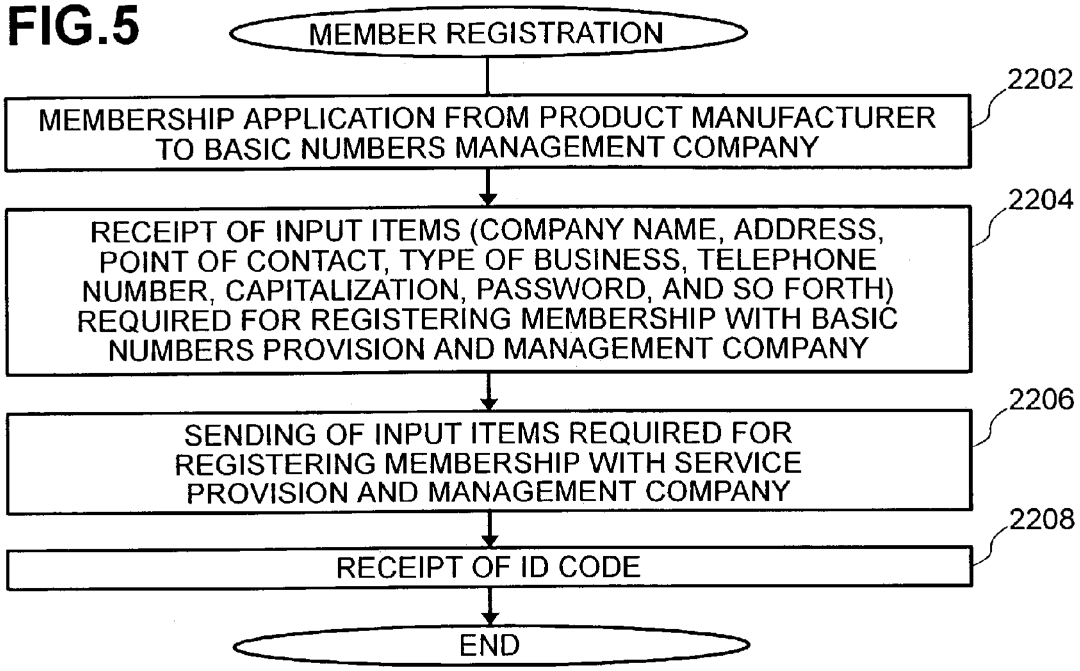
FIG. 5 is a flowchart of product manufacturer-side membership registration processing for a product manufacturer to become a member of a basic numbers management company.

FIG. 5 shows a flowchart of the membership registration process performed by the product manufacturer 2 which allows product manufacturer 2 to become a member of basic numbers management company 1. In this figure, in Step 2202, product manufacturer 2 applies to basic numbers management company 1 for membership registration. When product manufacturer 2 makes a membership registration application to basic numbers management company 1, in Step 2204, an identification of the items required for membership registration (company name, address, point of contact, type of business, telephone number, capitalization, password, and so forth) is presented to product manufacturer 2 from basic numbers management company 1, and product manufacturer 2 receives the indication of these items required for membership registration.

When product manufacturer 2 receives an identification of the items required for membership registration, in Step 2206, product manufacturer 2 transmits the items required for membership registration to basic numbers management company 1. When product manufacturer 2 transmits the input items required for membership registration to basic numbers management company 1 in this Step 2206, basic numbers management company 1 registers this information in product manufacturer database 13, shown in FIG. 4. Once registration in this product manufacturer database 13 has been carried out, basic numbers management company 1 allocates an ID code (service identifier) to product manufacturer 2, and, in Step 2208, product manufacturer 2 receives the ID code from basic numbers management company 1, and membership registration is terminated.

Figure 6:
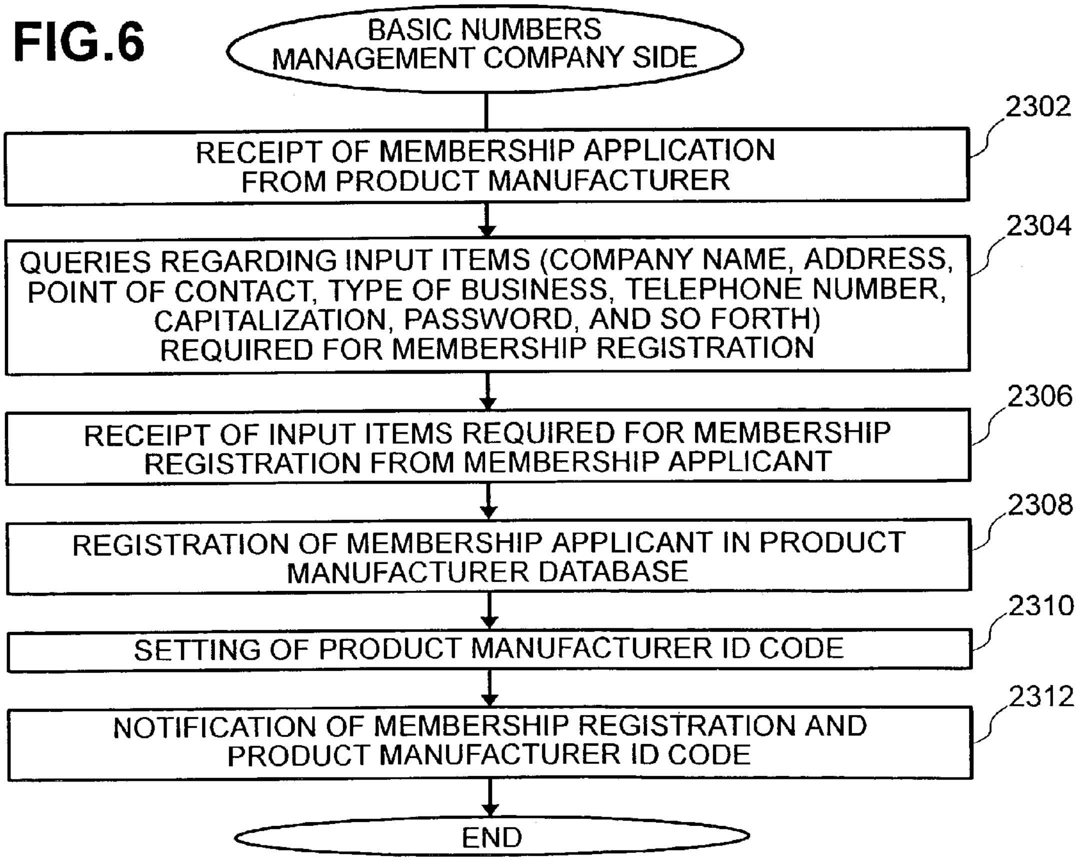
FIG. 6 is a flowchart of basic numbers management company-side membership registration processing for a product manufacturer to become a member of a basic numbers management company.

FIG. 6 shows a flowchart of the membership registration process performed by the basic numbers management company 1 which allows product manufacturer 2 to become a member of basic numbers management company 1. In the figure, in Step 2302, basic numbers management company 1 receives a membership registration application from product manufacturer 2. Once basic numbers management company 1 receives a membership registration application from product manufacturer 2, in Step 2304, basic numbers management company 1 informs product manufacturer 2 regarding input items required for membership registration (company name, address, point of contact, type of business, telephone number, capitalization, password, and so forth). Once this information has been sent to product manufacturer 2 regarding input items required for membership registration, in Step 2306, basic numbers management company 1 waits for receipt of the input items required for membership registration from product manufacturer 2. When basic numbers management company 1 receives the input items required for membership registration from product manufacturer 2, in Step 2308, basic numbers management company 1 carries out membership registration by storing this information in product manufacturer database 13, shown in FIG. 4.

Once registration in product manufacturer database 13 has been carried out, in Step 2310, basic numbers management company 1 sets an ID code for product manufacturer 2. Once the ID code has been set, in Step 2312, basic numbers management company 1 notifies product manufacturer 2 that membership registration has been carried out, indicates the ID code that was set, and terminates the membership registration flow.

Figure 7:
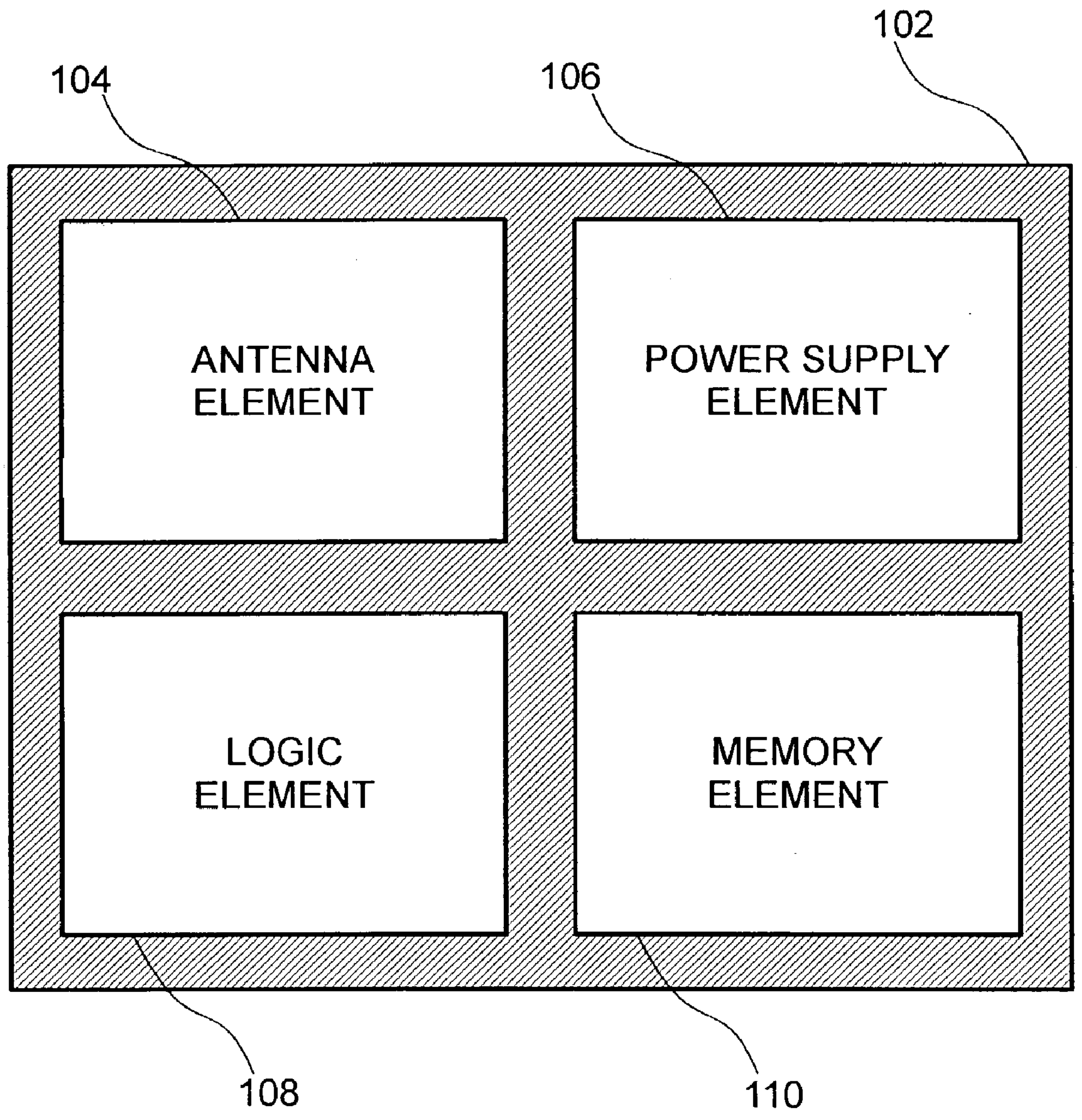
FIG. 7 is a diagram of a contactless IC chip, which represents an embodiment of the present invention.

The constitution of the contactless IC chip used by product manufacturer 2 is shown in FIG. 7. In the figure, IC chip 102 comprises an antenna element 104, a power supply element 106, a logic element 108, and a memory element 110. A contactless IC chip is supplied with power, and it transceives a clock and data by a radio wave sent to the antenna element 104 from a reader without having a point of contact. There are IC chips with the antenna element inside the chip, and others that have the antenna element outside. FIG. 7 supposes an IC chip having the antenna element inside the chip. As for IC chips having the antenna element on the outside of the chip, the antenna element is attached to the exterior of the chip. In accordance with the present invention, whether the antenna element is on the inside of the chip or on the outside of the chip has no affect on the system, and the present invention applicable to both cases. Further, there is electromagnetic induction and numerous other methods for achieving a contactless system consisting of a reader and an antenna element. The present invention is applicable to all of these methods.

Next, the operation of the IC chip win be explained. First, a radio wave is received by the antenna element 104 and converted into power by the power supply element 106, generating the power used by all the circuitry in the IC chip. The radio wave received by antenna element 104 fetches a clock component, and this clock component is used as the clock for all of the IC chip circuits. The logic element 108 carries out processing in accordance with commands sent from a reader. The memory element 110 is the region for storing information that must be stored in the IC chip. An IC chip utilized in a RFID tag of the present invention makes use of a ROM, which is read-only memory, as the memory element. Since read only RFID tag data is written in when chips are manufactured at a plant, this data cannot be changed even when the tags are supplied to a customer. Since a customer can write data to a read and write RFID tag, it is dangerous to use read and write RFID tags because they are susceptible to counterfeiting.

Figure 8:
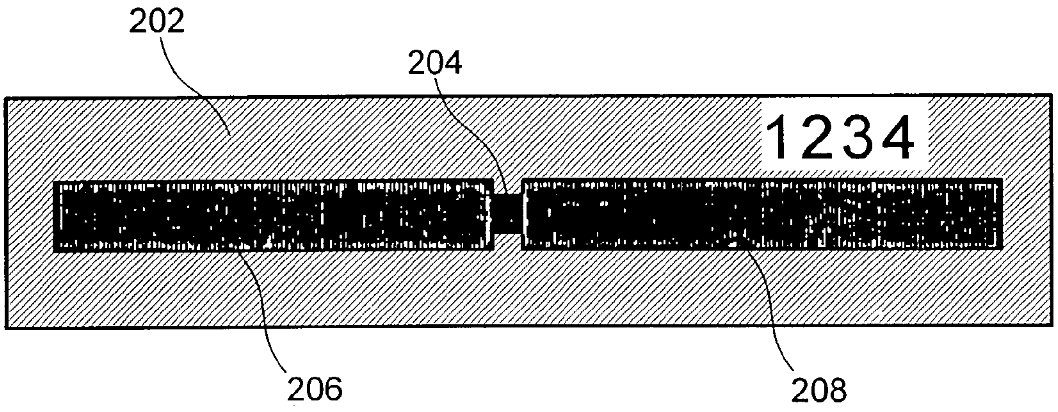
FIG. 8 is a diagram showing an IC chip-equipped seal as seen from above, in which the IC chip of FIG. 7 is mounted in a seal.

FIG. 8 shows an example of a RFID tag. This RFID tag is produced by attaching antennas 206 and 208, for sending and receiving information to and from a reader, respectively, to a contactless IC chip 204 and sandwiching the RFID tag in a seal 202 for reinforcement.

Figure 9:
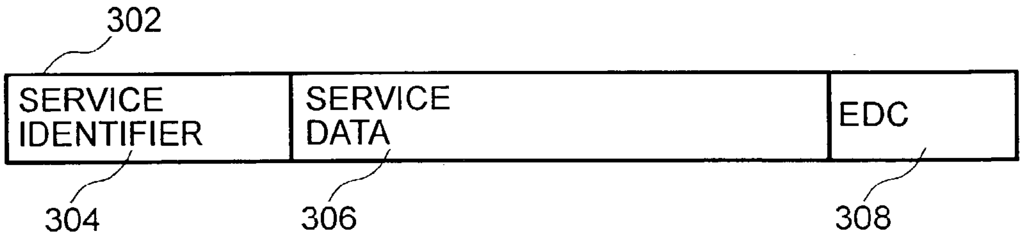
FIG. 9 is a diagram of a service identifier and service data stored inside a read only RFID tag of the present invention.

FIG. 9 is a diagram showing an example of the data structure of a RFID tag. In the figure, the RFID tag data structure 302 comprises a service identifier 304, which is allocated in common with a specific application or category, and service data 306, which represents unique data f or categorizing within a specific application or category, and a serial number for making it possible to distinguish RFID tags having the same service identifier. The EDC (Error Detecting Code) 308 is used for checking for data reading errors. The EDC functions the same as parity, in which a parity check is used for ascertaining the compatibility of tag information data. An EDC check is carried out, and only normal data is utilized. Data that does not satisfy an EDC check is treated as invalid data.

In order to confirm whether or not a product or the like is genuine, the tag information of the RFID tag attached to this product is read; and, if this information comprises the service identifier allocated to this product, then it can be considered genuine. By reading the tag information of a RFID tag-equipped article, to which a read only RFID tag is affixed, this article can be considered genuine if the proper service identifier is stored therein.

Service data can be appended with serial numbers for use in managing individual products, information showing the manufacturing date, and data manifesting the version of a product, as well as a detailed classification of a product. Service data can be used when the external appearance of different products is the same, and when a customer wishes to append versions or detailed classifications thereto.

Because sequential data has been stored in read only RFID tags to date, this sequential data attached to a product had to be checked in order to confirm whether or not this product was genuine, and the communications cost involved in the checks could be expensive. In accordance with the present invention, verifying the service identifier alone makes it possible to confirm whether or not an article is genuine. Since a read and write RFID tag enables a service identifier to be easily written as tag information, it does not possess high counterfeiting prevention capabilities.

Figure 10:
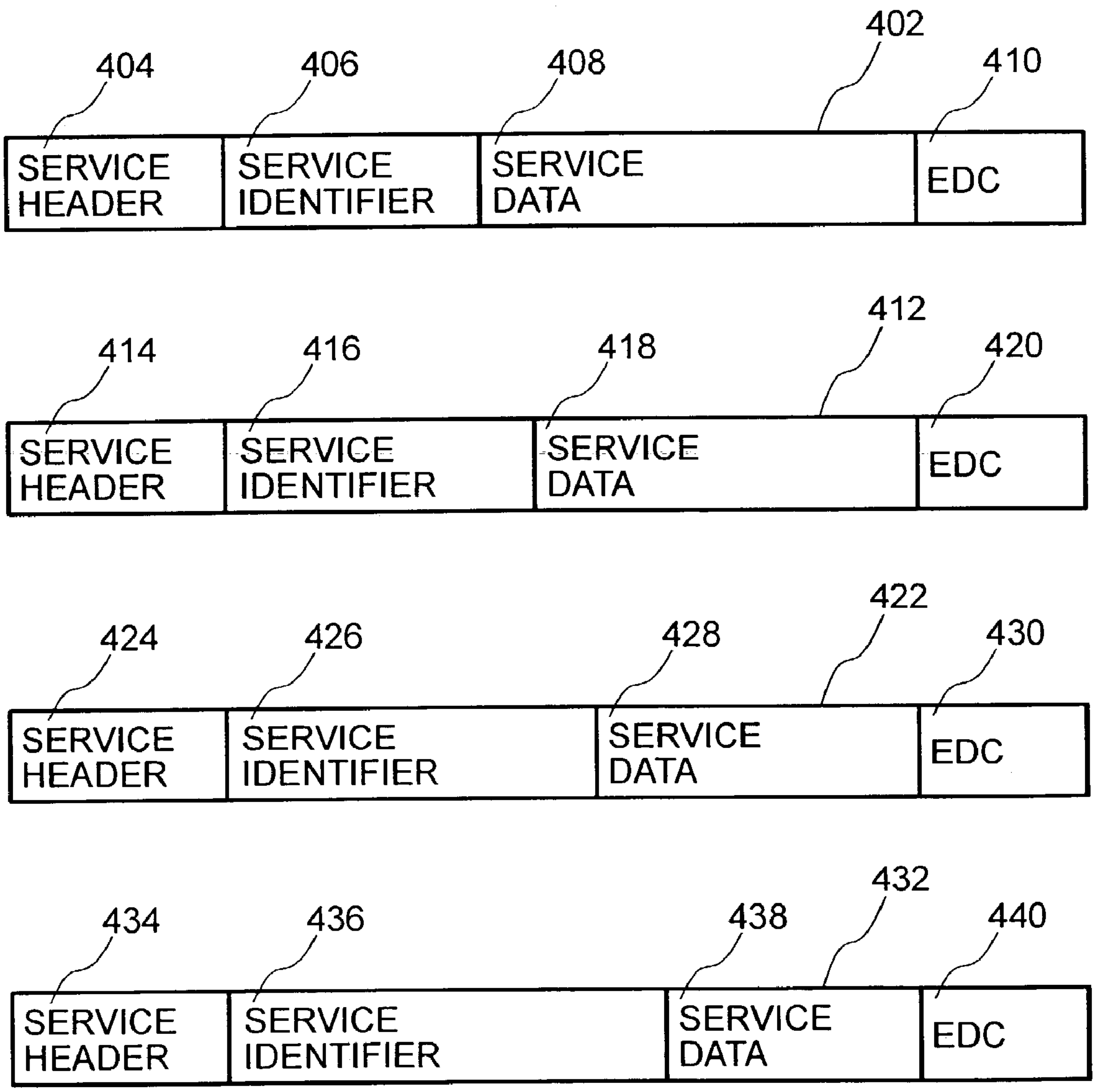
FIG. 10 is a diagram which shows a plurality of service identifiers of different lengths which are realized by attaching service headers.

FIG. 10 is directed to the adoption of service identifier lengths of a plurality of types as the data 302 of a single RFID tag. Since user data can also be stored in service data, in certain types of applications, long service data is required; and, since a RFID tag in accordance with the present invention is constituted so as to be applicable to numerous applications, it is desirable that the length of the service identifier be long, so as to enable the use of large numbers of service identifiers. If the length of data used in a service identifier is 10 bits, it can only be applied to 1024 applications. Conversely, if the length of the data used in a service identifier is set at 32 bits, it can be applied to approximately 4.2 billion services. In general, since the overall data length of a RFID tag is fixed, if the length of the EDC is also fixed, when the, data length of a service identifier is long, the data length that can be used for service data becomes short. Preparing a plurality of types of service identifier data lengths in this manner is advantageous in that these service identifiers can be used in applications requiring service data that has a long data length, and they can also be used in numerous applications.

In this embodiment, a service header 404 has a length of two bits, and it is constituted such that four types of service identifiers can be identified. Service identifier 406 of data 402 is 10 bits long, and the data lengths of service identifier 416, service identifier 426, and service identifier 436 are 14 bits, 24 bits, and 36 bits, respectively. The number of these bits determines the number of service identifiers that can be provided, and the length of the service data. A 36-bit service identifier is constituted such that a code corresponding to an EAN code (international article numbering code) can be used in a service identifier.

Figure 11:
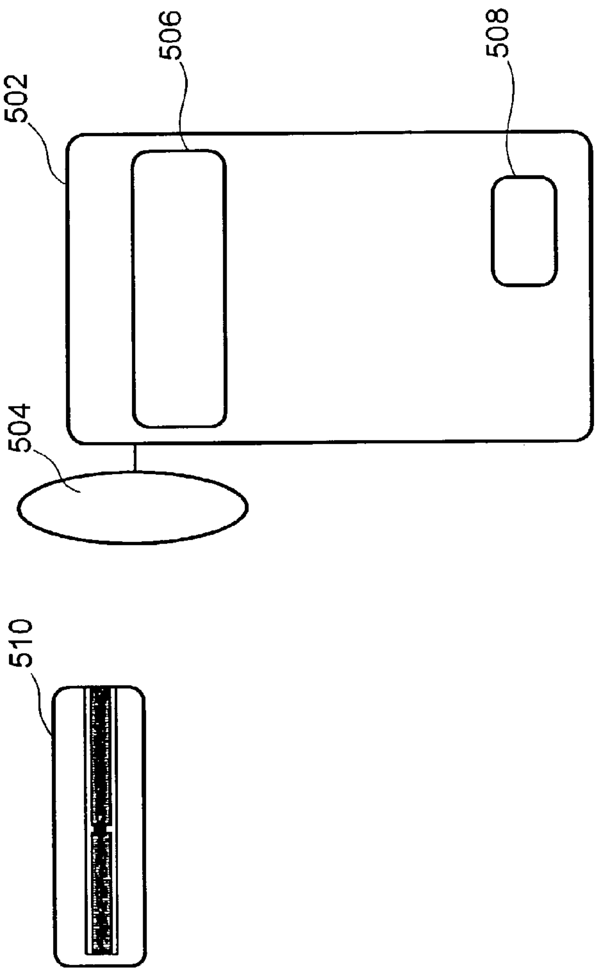
FIG. 11 is a diagram which shows an embodiment of an information processing system for reading RFID tags.

FIG. 11 shows an example of an information processing system 502 for reading RFID tags. Information processing system 502 for reading RFID tags has an antenna 504 for communicating with RFID tags. When a switch 508 is pushed to read data, radio waves are sent from antenna 504 to a RFID tag 510, and the RFID tag returns the results thereof to antenna 504. Information processing system 502 displays processing results on a display 506.

Figure 12:
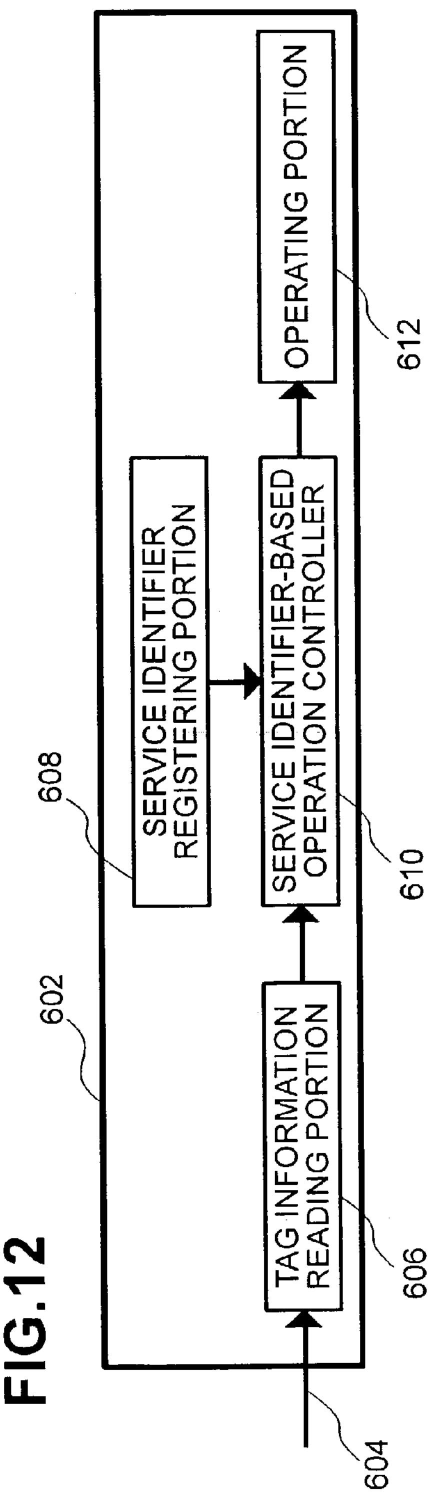
FIG. 12 is a software block diagram of the information processing system of FIG. 11.

FIG. 12 is an embodiment in which information processing is carried out by information processing system 502 using a service identifier received from a RFID tag. Information processing system 502 holds the service identifier of a RFID tag attached to a genuine article in service identifier recording portion 608. The service identifier recorded in service identifier recording portion 608 is used for comparison against the service identifier inside the tag information of the read RFID tag, and if the service identifiers are the same, the tagged article is considered genuine.

In determining whether or not an article is genuine, first, information processing system 502 uses tag information reader 606 to read tag information sent by a RFID tag from antenna 504, when a RFID tag is placed close to information processing system 502, or when a part to which a RFID tag is attached is used by information processing system 502. "Service identifier-based operation controller" 610 checks and determines whether or not a read service identifier is the same as the one stored in service identifier recording portion 608. A service identifier, which is treated as genuine, is recorded beforehand in service identifier recording portion 608 at the information processing system shipment time.

As for check and determination results-based operations, the operation control varies according to the application. For example, if the service identifiers are the same, instructions can be given to the operating portion 612 to display "genuine," or to open the lock on a door, and so forth. If they are not the same, instructions can be given to the operating portion 612 to display "not genuine," or to not open the lock on a door. If information processing system 502 is used to authenticate a printer or toner device, it can be used to ascertain whether or not an ink cartridge is genuine or factory approved by affixing RFID tags to the ink cartridges and the like. If information processing system 502 is used to authenticate an electrical appliance, it is possible to ascertain whether or not a part to be used therein is genuine by affixing RFID tags to batteries and other parts thereof. Further, if information processing system 502 is used to authenticate an automobile, it is possible to ascertain whether the tires are genuine, or whether the proper tires are being mounted, by applying RFID tags to the tires. By displaying the determination results, canceling an operation, or issuing a warning to the effect that an operation is inappropriate, it is possible to prevent the use of the wrong parts, and to prevent abnormalities from occurring.

Figure 13:
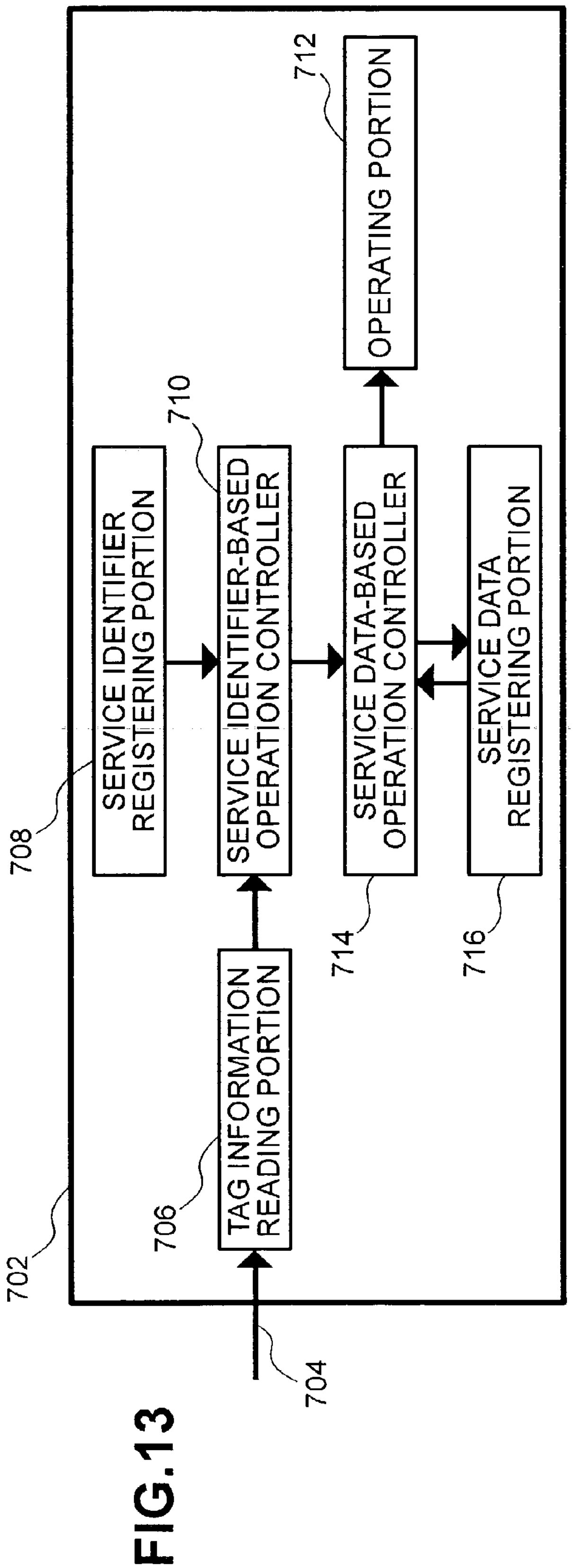
FIG. 13 is a block diagram which shows an embodiment in which control of the operating portion is carried out using service data in addition to a service identifier.

FIG. 13 shows an example of the information processing system 502, which also makes use of service data information, in addition to service identifiers. In article recognition by service identifiers alone, it is not possible to detect in information processing system 502 cases in which it is a problem if a certain article is reused. This embodiment makes use of serial numbers written to the service data inside the tag information of RFID tags, using these serial numbers to detect reuse.

If the service identifier 704 read by tag information reader 706 is determined to be the same as the service identifier recorded in service identifier recording portion 708 by "service identifier-based operation controller" 710, a check and determination are carried out for service data read by service data-based operation controller 714 and service data stored in service data recording portion 716. If there is a match, the article is considered reused; and, the operation when an article is being reused is communicated to operating portion 712. If there is no match, the read service data is stored in service data recording portion 716. Then, the operation when an article is being used for the first time is communicated to operating portion 712. If there is not enough memory to record read service data in service data recording portion 716, the oldest service data is deleted. The operation of the operating portion 712, when an article is being reused, will differ by application.

An embodiment, which applies the information processing system of FIG. 13 to equipment that utilizes consumable supplies, such as copying machines, will be explained. With equipment that utilizes consumable supplies, such as copying machines, there are cases in which it is necessary to determine whether or not a part being used to replenish a consumable item is appropriate. This is because, if the part is not appropriate, the equipment could be damaged or malfunction, or a major problem could occur in the operation of the equipment. In an application such as this, when tag information is read, either at the time a part is installed or when the equipment is powered up, the utilization status of the part is determined separately, and a serial number and utilization status are recorded as a set inside the service data in service data recording portion 716. Then, tag information is read anew when the part is installed, and when the serial number and separately determined utilization status inside the service data do not conform with the information recorded in service data recording portion 716, the part is not considered to be a normal part, and control is exercised such that either the status concerning the use of the part is displayed, the operation is shut down, or a warning is issued stating that operation is not advisable. As an example of nonconformance, there are cases in which, despite the fact that the contents of a consumable item of a part having a certain service data serial number is recorded as being empty in service data recording portion 716, when the service data serial number is read in anew, the contents are full. In a situation such as this, there is the possibility that the part was subjected to illegal processing, and that its use could result in an accident, such as the equipment breaking down. Therefore, for example, the operating portion carries out processing for stopping the use of this part.

Equipment for granting access to a room, when a RFID tag-embedded card is passed over a detector at the entrance, will be described as an embodiment, which applies the information processing system of FIG. 13 to equipment for controlling ingress and egress. Tag information of RFID tags is read by a tag information reader 706. A check is carried out by "service identifier-based operation controller" 710 to determine whether or not the service identifier of the read tag information is the same service identifier that is stored in service data recording portion 716. If the service identifiers are not the same, processing is terminated without opening the door. If the service identifiers are the same, a check and determination are carried out by service data-based operation controller 714 to determine whether or not the service data inside the read tag information is the same as the service data stored in service data recording portion 716. If the check results are the same, instructions are given to operating portion 712 to open the door. If the service data are not the same, the door is not opened. By storing beforehand, in service data recording portion 716, RFID tag service data that can only be used one time, RFID tag service data that can only be used that same day, RFID tag service data that can only be used on a specified day, or RFID tag service data that can only be used for a fixed period of time, control can be carried out by service data-based operation controller 714 in such a way that a gate will only be opened within an authorized period or time. Once a RFID tag has been utilized under an authorized condition, the contents of the service data of this RFID tag are deleted from the service data recording portion. By so doing, access can no longer be gained via this tag.

When all of the tag information of access-enabling RFID tags is to be used, all of the tag information of access-enabling RFID tags is stored in service identifier recording portion 608 according to the constitution of FIG. 12, tag information read out by tag information reader 604 is checked against all tag information stored in service identifier recording portion 608 by "service identifier-based operation controller" 610, and, if the same tag information is stored, instructions are outputted to operating portion 612 to open the door. In this embodiment as well, by storing the number of times or the dates that access is possible together with the tag information of the RFID tags, as a set in service identifier recording portion 608, it can become possible for "service identifier-based operation controller" 610 to exercise control such that a gate will only be opened within an authorized period.

When determining whether or not articles are genuine using service identifiers, it becomes necessary to add service identifiers, which indicate a genuine article, due to increases in the types of parts capable of being used and so forth. The data of service identifier recording portion 608 can also be updated using other inputting means of the information processing system, but it is desirable that service identifiers be capable of being updated by using RFID tags. More specifically, at the same time that a product manufacturer distributes a new product requiring new service identifiers, RFID tags for updating service identifiers can also be distributed together therewith, eliminating the time and trouble of updating the storing portions of the information processing system.

Figure 14:
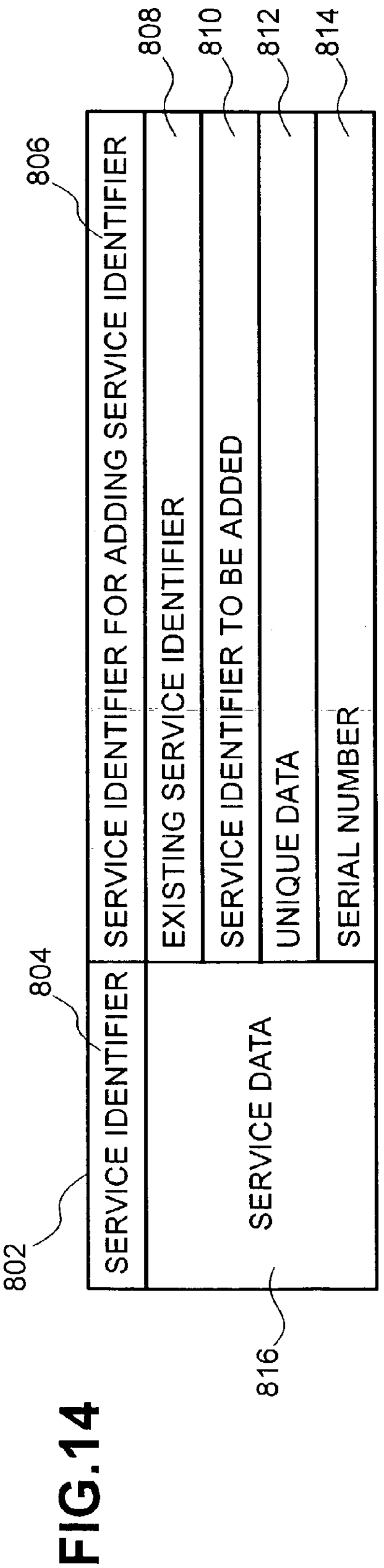
FIG. 14 is a diagram which shows an embodiment which utilizes a service identifier for adding a service identifier in order to update the contents of a service identifier recording portion, in which service identifiers are recorded by an information processing system.

An embodiment of a RFID tag, which utilizes a special service identifier for adding a new service identifier, will be described. FIG. 14 is a diagram showing the contents of the service identifier and service data of a RFID tag according to this embodiment. In the service identifier 804 of this embodiment, a service identifier for adding a service identifier 806 is used. In the service data 816, there is stored a service identifier 810, which will be added to an original service identifier 808, unique data 812, and a serial number 814. Original service identifier 808 is an identifier corresponding to the service identifier 304 used for ascertaining whether or not an article is genuine, and which is already stored in the service identifier recording portion.

Figure 15:
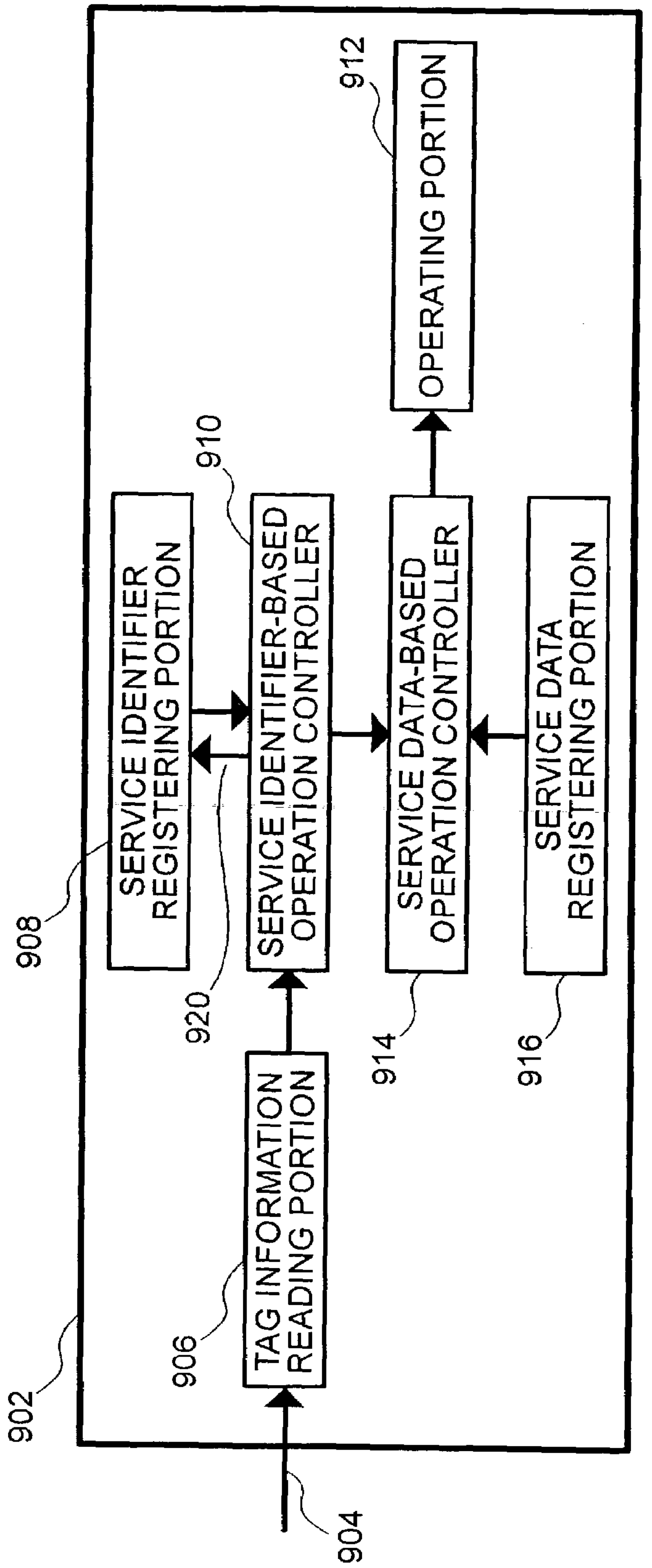
FIG. 15 is a block diagram of information processing system software for updating a service identifier recording portion using a RFID tag possessing the data of FIG. 14.
Figure 16:
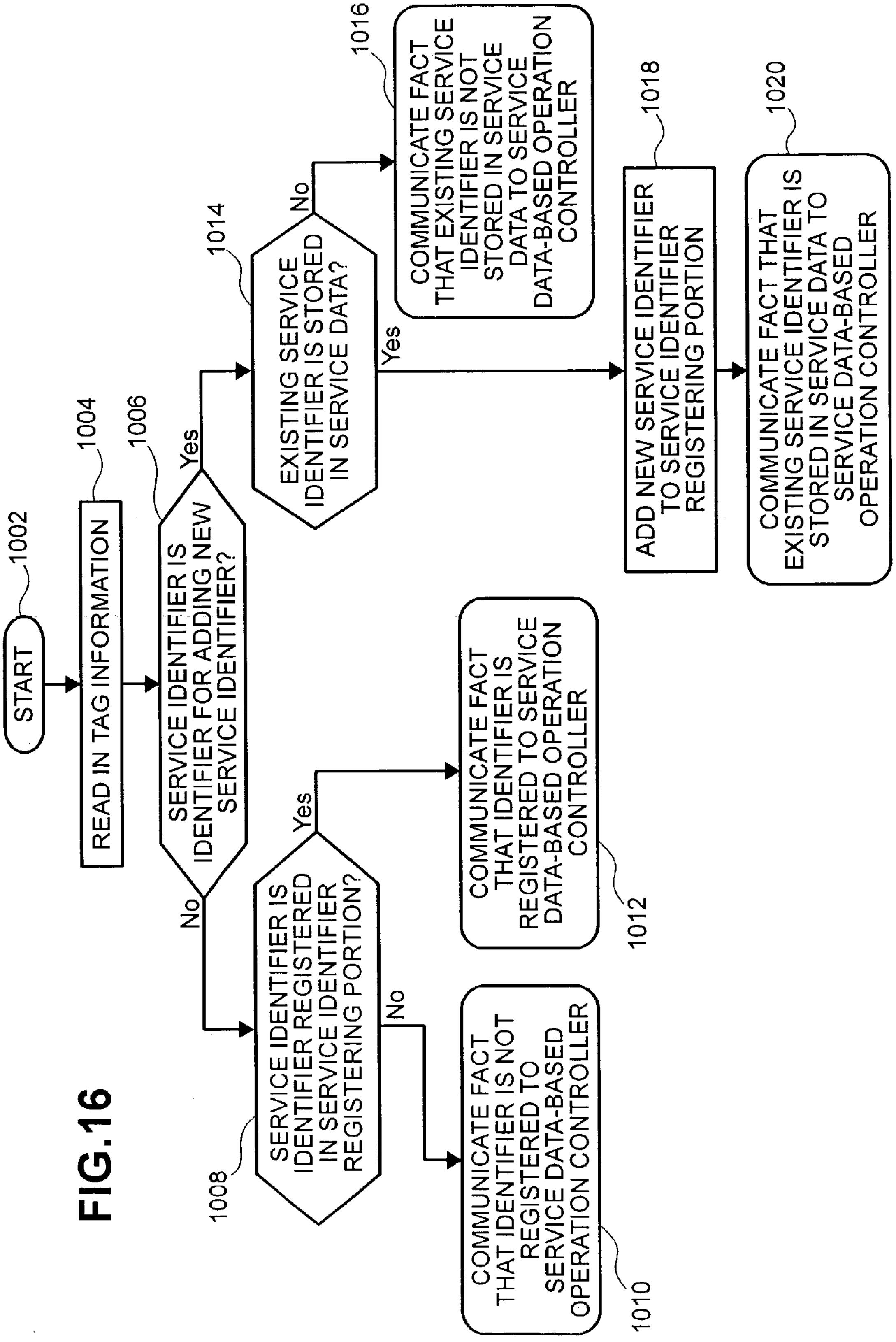
FIG. 16 is a process flow diagram of the processing of an operation controller based on a service identifier, in which the contents of the service identifier recording portion are updated by using a service identifier for adding a service identifier.

An embodiment of an information processing system for reading RFID tags, comprising service identifier 804 and service data 816 of FIG. 14, and adding a service identifier, is shown in FIG. 15. The identification of service identifier 804 is carried out by "service identifier-based operation controller" 910 for the tag information of RFID tags read by tag information reader 906. FIG. 16 shows the processing procedures for this operation. First, a check is made to determine whether or not the content of a read service identifier indicates a service identifier for adding a service identifier (1006). If this is not the case, a check is performed to determine whether or not the read service identifier is stored in service identifier storing portion 908 (1008). If it is stored there, the service data-based operation controller 914 is notified that the service identifiers match. Service data-based operation controller 914 carries out processing for a RFID tag that is correct. If the read-out service identifier is not stored in service identifier storing portion 908, the service data-based operation controller 914 is notified that the service identifiers do not match. Service data-based operation controller 914 carries out processing for a RFID tag that is not appropriate, for example, for a counterfeit. This processing is the same as the processing described with reference to FIG. 13.

If the content of the read service identifier indicates that it is the service identifier for adding a service identifier 806, a check is made to determine whether or not the existing service identifier 808, which is stored in service data, is recorded in service identifier recording portion 908 (1014). If it is not recorded, the fact that the existing service identifier of the service data is not recorded is communicated to the service data-based operation controller (1016) and processing is carried out for a RFID tag that is not appropriate. If it is recorded, the service identifier (810) to be added to the service identifier recording portion (908) is added and recorded (1018). Thereafter, the fact that the existing service identifier is stored inside the service data is communicated to the service data-based operation controller (1020), and processing is carried out for an appropriate RFID tag.

In this embodiment, a service identifier is added and recorded in service identifier recording portion 908 by service identifier-based operation controller 910 (920).

Next, an embodiment of a RFID tag for adding a new service identifier to the information processing system, using an existing service identifier, will be described with reference to FIG. 17. Existing service identifier 1106 is stored in service identifier 1104. This is the same as the ordinary utilization method. In the service data 1116 of this embodiment, there is a data region of a service identifier addition flag 1108, which indicates that a service identifier 1110 to be added exists inside the service data. If the service identifier addition flag 1108 is "ON," this indicates that there is a service identifier 1110 to be added after the service identifier addition flag 1108, and if it is "OFF," this indicates that there is no service identifier 1110 to be added after the service identifier addition flag 1108. The unique data 1112 and serial numbers 1114 are the same as those used in the embodiment of FIG. 12 and FIG. 13.

Figure 17:
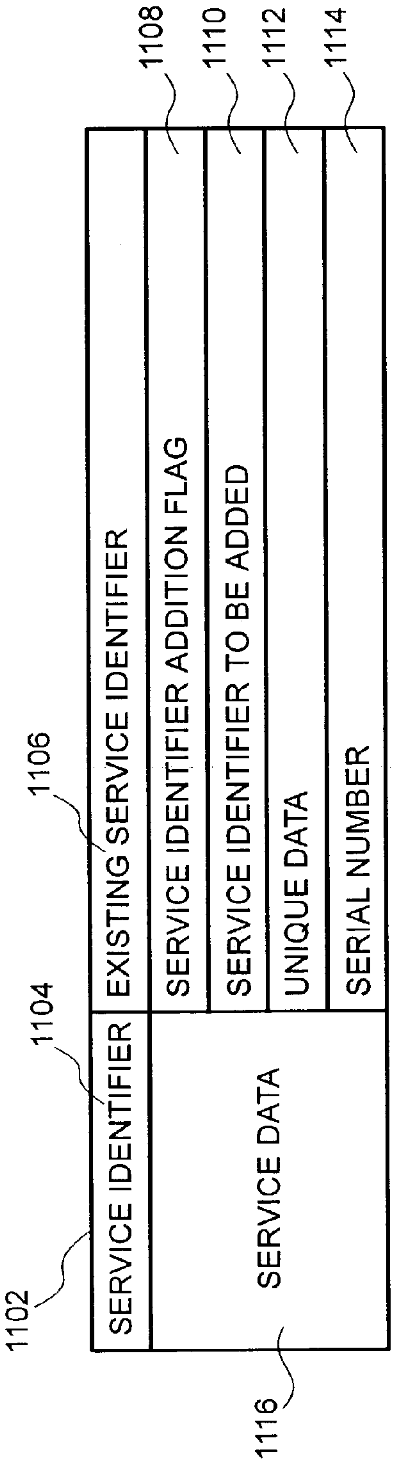
FIG. 17 is a diagram which shows an embodiment which uses a service identifier addition flag for updating the contents of the service identifier recording portion, in which service identifiers are recording by an information processing system.
Figure 18:
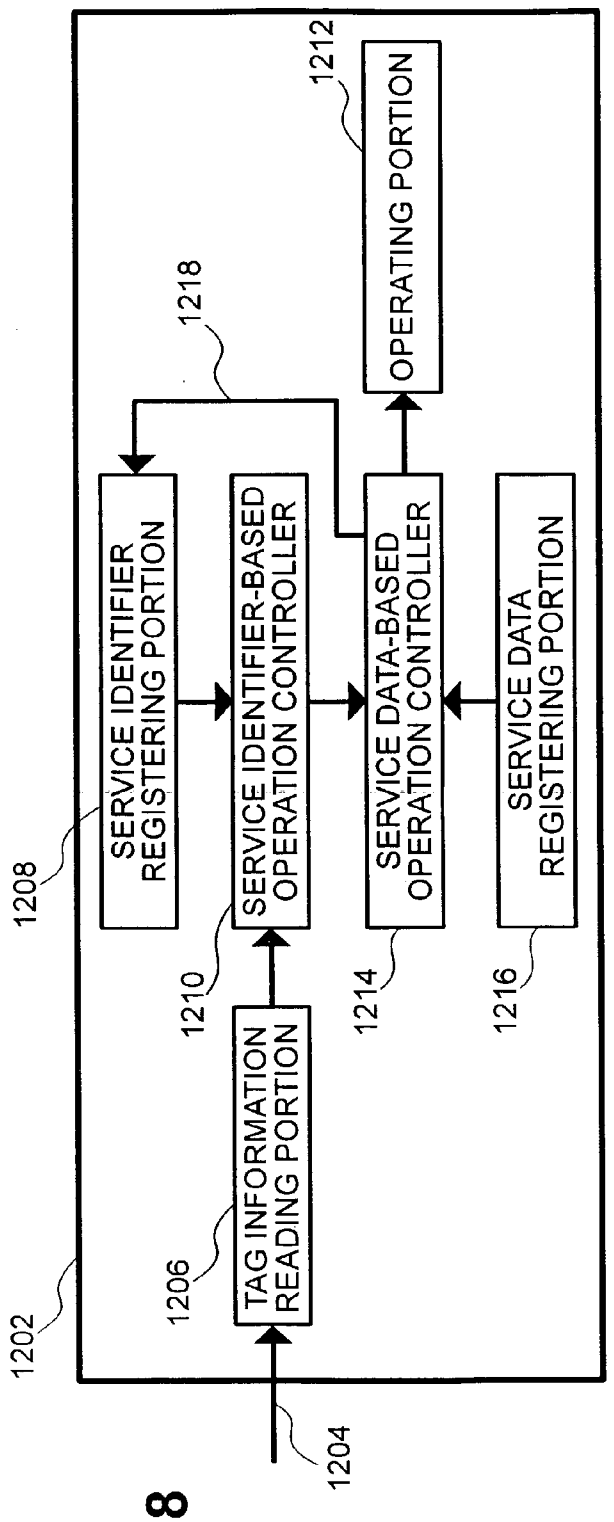
FIG. 18 is a block diagram of information processing system software for updating a service identifier recording portion using a RFID tag possessing the data of FIG. 13.
Figure 19:
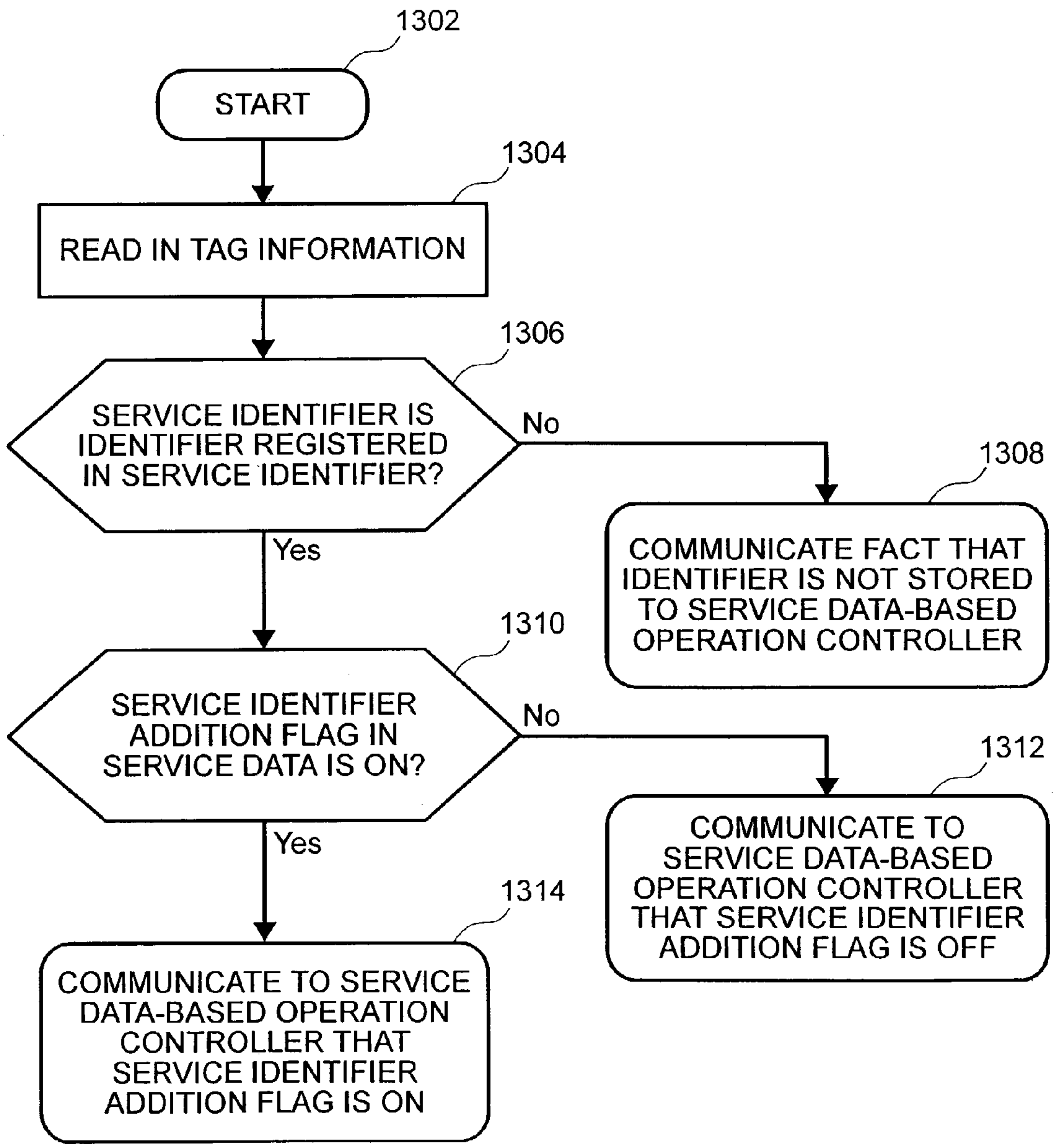
FIG. 19 is a process flow diagram showing the processing of an operation controller based on service data, which updates the contents of a service identifier recording portion using a service identifier addition flag.

An embodiment of a "service identifier-based operation controller" 1210 of an information processing system, for when the addition of service identifiers is carried out using RFID tags that utilize the data shown in FIG. 17, is shown in FIG. 18 and FIG. 19. First, a check is made by service identifier-based operation controller 1210 to determine whether or not a service data identifier of the tag information, which was read out by tag information reader 1208, is the service identifier recorded in service identifier recording portion 1208 (1306). If not, the fact that it is not recorded is communicated to service data-based operation controller 1214 (1308). If so, a check is carried out to determine whether or not the service identifier addition flag of the service data is ON (1310). If it is "OFF," the fact that the service identifier addition flag is OFF is communicated to service data-based operation controller 1214 (1312), and ordinary processing is carried out. If the flag is "ON," the fact that the service identifier addition flag is ON is communicated to service data-based operation controller 1214 (1314). Service data-based operation controller 1214 adds the service identifier 1110 to be added to service identifier recording portion 1208.

These are embodiments for the addition of service identifiers, but it is also possible to consider deletion of service identifiers in the same way.

Figure 20:
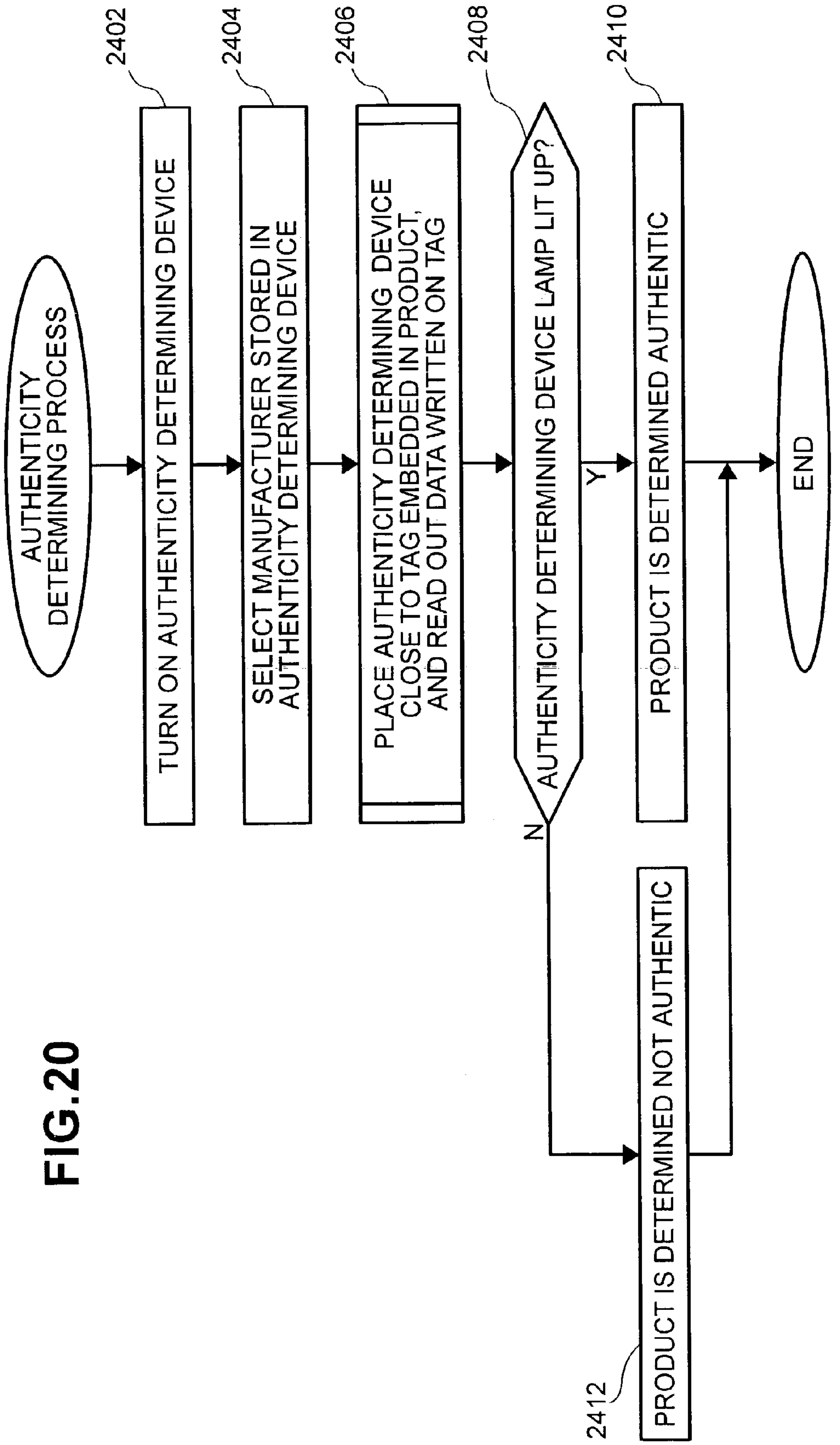
FIG. 20 is a process flow diagram showing the flow of an authenticity determining process utilizing the present invention.

FIG. 20 shows the flow of an authenticity determining process that employs the present invention. That is, in Step 2402, an authenticity determining device for reading data stored in RFID tags 50 is turned ON. When the authenticity determining device for reading data stored in RFID tags 50 is turned ON, in Step 2404, the selection of a manufacturer (the manufacturer to become the target of authenticity determinations) recorded in the authenticity determining device is carried out. When the selection of a manufacturer recorded in the authenticity determining device has been carried out, in Step 2406, the authenticity determining device is placed close to a RFID tag 50 embedded in a product, and the information that has been written to the RFID tag 50 is read. When the information that has been written to the RFID tag 50 embedded in a product has been read, in Step 2408, a determination is made as to whether or not the lamp of the authenticity determining device has lit up.

When it is determined that the lamp of the authenticity determining device has lit up, in Step 2410, it is determined that the product, to which the RFID tag 50 is attached and from which the data was read, is authentic. Further, when it is determined that the lamp of the authenticity determining device did not light up, in Step 2412, it is determined that the product, to which the RFID tag 50 is attached and from which the data was read, is not authentic. Then, the authenticity determining process according to this authenticity determining device ends.

Furthermore, the flow of this authenticity determining process is constituted such that the lamp of the authenticity determining device lights up when the product, to which the RFID tag 50 is attached and from which the data was read, is authentic, and the lamp of the authenticity determining device does not light up when the product, to which the RFID tag 50 is attached and from which the data was read, is not authentic; however, this process can also be constituted such that the lamp of the authenticity determining device lights up when the product attached, to which the RFID tag 50 is attached and from which the data was read, is not authentic, and the lamp of the authenticity determining device does not light up when the product, to which the RFID tag 50 is attached and from which the data was read, is authentic.

Further, a lamp was used in the embodiment described hereinabove, but the present invention can also be constituted such that a check can be carried out by displaying the name of the manufacturer and the product name using a text display.

What is claimed is:

1. A RFID tag, which has a read-only memory and transmits and receives tag information stored in said read-only memory, said tag information comprising a service identifier for setting a value common to a specific application or category of items, and service data for setting different values for uniquely identifying an item to which the RFID tag is attached within said specific application or category, when compared to all items of the specific application, wherein said service identifier is used, without using said service data, to authenticate whether the item to which the RFID tag is to be attached is genuine.

2. The RFID tag according to claim 1, wherein said different values of said service data are any one of serial numbers assigned to individual RFID tags, manufacturing period information and serial numbers assigned to individual RFID tags, or service classifications and serial numbers assigned to individual RFID tags.

3. The RFID tag according to claim 1, wherein the length of said read-only memory is fixed;

the RFID tag can have a plurality of types of data length for said service identifier;

the RFID tag has a service header, which indicates the type of data length of said service identifier;

the data length of said service data increases or decreases in accordance with increases or decreases of the data length of said service identifier; and in respective types of service identifiers, the sum of the data length of the service identifier and the data length of the service data is fixed.

4. The RFID tag according to claim 3, wherein the RFID tag has two bits for said service header;

the RFID tag has four types of data length for said service identifier;

the length of said service identifier is any one of 10 bits, 14 bits, 24 bits, and 36 bits, while the length of said service data is any one of 88 bits, 84 bits, 74 bits and 62 bits, respectively; and the RFID tag has 24 bits for the bits for error detection.

5. The RFID tag according to claim 1, wherein said tag information consists of information designating a new service identifier that is to be additionally recorded in a recording portion which stores service identifiers stored beforehand.

6. A determining device, comprising:

a reader that reads tag information from a RFID tag, which has a read-only memory, transmits and receives information stored in said memory, and has tag information including a service identifier which sets a value common to a specific application or category of items as information in said memory and service data for setting different values for uniquely identifying an item to which the RFID tag is to be attached within said specific application or category, when compared to all items of the specific application or category, wherein said service identifier, without using said service data, is used to authenticate whether the item to which the RFID tag is to be attached is genuine;

a service identifier recording portion which records said service identifier;

a service data portion which records said service data; and a first determining portion which determines whether or not a service identifier read by said reader matches a service identifier recorded by said service identifier recording portion.

7. The determining device according to claim 6, further comprising an operating portion which either displays determination results, shuts down an operation, or issues a warning that an operation would be inappropriate, when a determination is made by said first determining portion that the service identifiers do not match.

8. A determining device, comprising:

a reader that reads tag information from a RFID tag, which has a read-only memory, transmits and receives information stored in said memory, and has tag information including a service identifier which sets a value common to a specific application or category of items as information in said memory and service data for setting different values for uniquely identifying an item to which the RFID tag is to be attached within said specific application or category, when compared to all items of the specific application or category, wherein said service identifier constitutes information that is used, without using said service data, to authenticate whether the item to which the RFID tag is to be attached is genuine;

a service identifier recording portion which records said service identifier;

a service data portion which records said service data;

a first determining portion which determines whether or not a service identifier read by said reader matches a service identifier recorded by said service identifier recording portion; and an operating portion which either displays determination results, shuts down an operation, or issues a warning that an operation would be inappropriate, when a determination is made by said first determining portion that the service identifiers do not match, wherein said first determining portion determines whether an article is authentic or false while said article is being used and is attached to the first determining portion, and wherein said operating portion either displays whether the article is authentic or false, shuts down an operation if the article is false, or issues a warning that an operation would be inappropriate if the article is false.

9. A determining device, comprising:

a reader that reads tag information from a RFID tag, which has a read-only memory, transmits and receives information stored in said memory, and has tag information including a service identifier which sets a value common to a specific application or category of items as information in said memory and service data for setting different values and uniquely identifying an item to which the RFID tag is to be attached within said specific application or category, when compared to all items of the specific application or category, wherein said service identifier is used, without using said service data, to authenticate whether the item to which the RFID tag is to be attached is genuine; a service identifier recording portion which records said service identifier;

a first determining portion which determines whether or not a service identifier read by said reader matches a service identifier recorded by said service identifier recording portion while said article is being used and is attached to the first determining portion, a service data recording portion which records said service data; and a second determining portion which determines whether or not service data read by said reader matches service data recorded in said service data recording portion.

10. The determining device according to claim 9, further comprising:

an operating portion which either displays determination results, shuts down operation, or issues a warning that operation would be inappropriate, when a determination is made by said second determining portion that the read service data does not match the recorded service data, wherein the first determining portion includes a service data-based operation controller and an operating portion, wherein the service data-based operation controller controls the operating portion according to the relationship between a utilization status stored in the service data recording portion and an actual utilization status of consumable supplies.

11. The determining device according to claim 10, wherein said service data is information related to the utilization status of an article to which a RFID tag is attached;

said second determining portion determines the usability of said article; and said operating portion either displays the utilization status, shuts down an operation when said article is unusable, or issues a warning that an operation would be inappropriate when said article is unusable.

12. The determining device according to claim 10, wherein said reader reads a RFID tag to which a code of a specific product manufacturer and a code of a specific product of this specific product manufacturer are allocated, and wherein the fact that a product is authentic is displayed when these codes match the code of a specific product manufacturer and the code of a specific product of this specific product manufacturer that has been stored beforehand.

13. A determining device, comprising:

a reader that reads tag information from a RFID tag, which has a read-only memory, transmits and receives information stored in said memory, and has tag information including a service identifier which sets a value common to a specific application or category of items as information in said memory and service data for setting different values for uniquely identifying an item to which the RFID tag is to be attached within said specific application or category, when compared to all items of the specific application or category, wherein said service identifier is used, without using said service data, to authenticate whether the item to which the RFID tag is to be attached is genuine;

a service identifier recording portion which records said service identifier;

a first determining portion which determines whether or not a service identifier read by said reader matches a service identifier recorded by said service identifier recording portion, wherein said service identifier recording portion is capable of additionally recording a new service identifier, wherein said additional recording is either carried out by inputting, or by reading a RFID tag, which has a read-only memory, transmits and receives information stored in said memory, and has information which designates a new service identifier for additionally recording a new service identifier and the additional recording thereof in a service identifier recording portion.

14. A determining method, comprising the steps of:

reading, by a reader, tag information from a RFID tag, which has a read-only memory, transmits and receives information stored in said memory, and has tag information including a service identifier which sets a value common to a specific application or category as information said memory and service data for setting different values for uniquely identifying an item to which the RFID tag is to be attached within said specific application or category, when compared to all items of the specific application or category, wherein said service identifier is used, without using said service data, to authenticate whether the item to which the RFID tag is to be attached is genuine;

recording in a service identifier recording portion said service identifier;

recording in a service data portion said service data; and determining by a first determining portion, whether or not a service identifier read by said reader matches a service identifier recorded by said service identifier recording portion while said article is being used and is attached to the first determining portion,

- determining, by a second determining portion, whether or not service data read by said reader matches service data recorded in said service data recording portion,
- reading a RFID tag to which a code of a specific product manufacturer is allocated; and
- displaying the fact that a product is authentic when this code matches the code of said specific product manufacturer which has been stored beforehand.

15. A management system for managing tag information of a RFID tag, said management system comprising:

- wherein said RFID tag has a read-only memory, transmits and receives information stored in said memory, and has tag information comprising a service identifier for setting a value common to a specific application or category of items, and service data for setting different values for uniquely identifying an item to which the RFID tag is to be attached within said specific application or category, when compared to all items of the specific application or category,
- wherein said service identifier is used, without using said service data, to authenticate whether the item to which the RFID tag is to be attached is genuine;
- a manufacturer database which registers a manufacturer, which handles an article to which said RFID tag is attached;
- a service identifier database which allocates and registers a service identifier for setting a value common to the application or category utilized by said manufacturer;
- a service data database which allocates and registers service data for setting different values for categorizing within the application or category utilized by said manufacturer; and
- a basic number manager that allocates service identifiers in reply to the request for the allocation of service identifiers from product manufacturer and notifies the allocated service identifiers to the product manufacturer.

16. The management system according to claim 15, further comprising:

- an additional service data database for the additional allocation and registration of new service data relative to said service;
- wherein the basic number manager makes an additional allocation of service identifiers in reply to the request for the allocation of service identifiers from product manufacturer and notifies the additionally allocated service identifiers to the product manufacturer.

17. A management method for managing tag information of a RFID tag comprising the steps of:

- wherein said RFID tag has a read-only memory, transmits and receives information stored in said memory, and has tag information comprising a service identifier for setting a value common to a specific application or category of items, and service data for setting different values for uniquely identifying an item to which the RFID tag is to be attached within said specific application or category, when compared to all items of the specific application or category,
- wherein said service identifier is used, without using said service data, to authenticate whether the item to which the RFID tag is to be attached is genuine;
- registering a manufacturer, which handles an article to which said RFID tag is attached;
- allocating a service identifier in response to a request for a service identifier from said article handling manufacturer; and
- identifying the allocated service identifier to said article handling manufacturer, to the manufacturer which manufactures the memory of said RFID tag, and to the manufacturer which manufactures the determining device for reading the tag information of said RFID tag.

18. The management method according to claim 17, further comprising the steps of:

- allocating service data in response to a request for service data from said article handling manufacturer; and
- identifying the allocated service data to said article handling manufacturer, to the manufacturer which manufactures the memory of said RFID tag, and to the manufacturer which manufactures the determining device for reading the tag information of said RFID tag.

19. The management method according to claim 18, further comprising the steps of:

- making an additional allocation of service data in response to a request for new service data from said article handling manufacturer; and
- identifying the additionally allocated service data to said article handling manufacturer, to the manufacturer which manufactures the memory of said RFID tag, and to the manufacturer which manufactures the determining device for reading the tag information of said RFID tag.

* * * * *